United States Patent Office 3,494,269
Patented Feb. 10, 1970

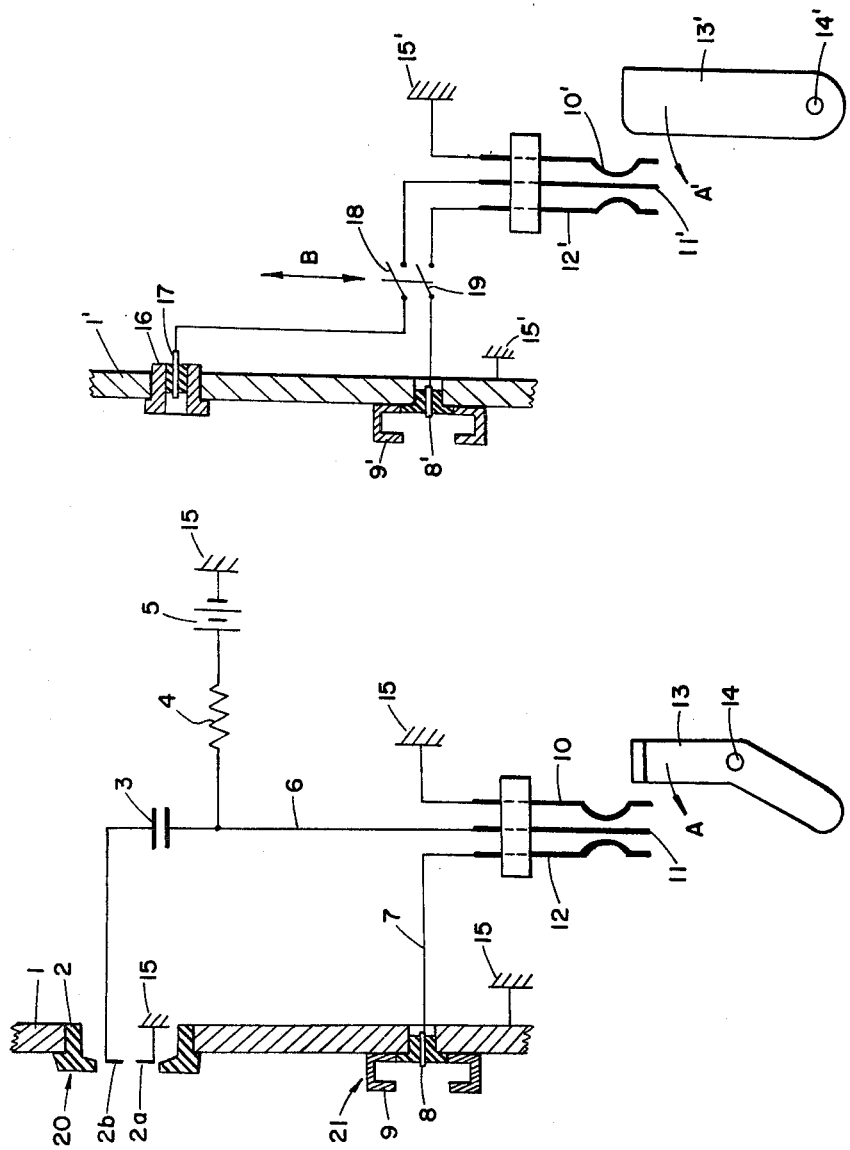

3,494,269
PHOTOGRAPHIC CAMERA COMPRISING A FLASH SYNCHRONIZATION DEVICE AND THE LIKE
Ernst Lieser, Stuttgart-Waihingen, Germany, assignor to Eastman Kodak Company, Rochester, N.Y.
Filed May 10, 1967, Ser. No. 637,533
Claims priority, application Germany, May 18, 1966, K 59,289
Int. Cl. G03b 9/70
U.S. Cl. 95—11.5                                    5 Claims

ABSTRACT OF THE DISCLOSURE

A photographic camera having a plurality of sockets for receiving photoflash units, separate synchronization contacts for each of the sockets, and a mechanism for sequentially closing the synchronization contacts in response to operation of the camera. One of the contact elements for each of the sockets is electrically connected to a common conductor in the camera while the other contact element for each socket is electrically connected to a separate synchronization contact in the camera. The mechanism initially connects one of the synchronization contacts to the common conductor, in response to camera operation, and thereafter connects the remainder of the synchronization contacts to the common conductor. Alternatively, the camera may be provided with an additional member for normally disconnecting the synchronization contacts from the other contact elements when the camera is not being used to prevent a premature energization of the photoflash units which are received in the sockets.

BACKGROUND OF THE INVENTION

Field of the invention

This invention relates to photographic apparatus, and particularly to means for synchronizing a plurality of electrically operated photo devices, such as flash devices, that are energizable by their own sources of electrical potential.

Description of the prior art

In photographic apparatus, such as cameras, having a plurality of connections by which more than one photoflash device can be connected at the same time to a source of electrical energy, it is important to preclude electrical interferences between those connections that might produce such undesired effects as flash failure, premature ignition, and electrical shock to the operator.

To avoid this problem, some prior-art cameras having both a built-in flash-lamp socket and means adapted to receive a separable flash device are provided with switch means, such as that disclosed in U.S. Patent No. 3,286,612, for electrically disconnecting the built-in socket from the energy source when the separable flash device is attached to the camera. Such cameras pose the obvious disadvantage of having only one flash device operational at a given time.

It is also known in the art, as described in the above-cited U.S. Patent 3,286,612, for a camera to have photoflash connections in the center contact of an accessory shoe and in a separate contact nipple. Here, too, using the example of an electronic flash unit connected by a connector cable to the contact nipple, it is necessary to disconnect electrically the exposed connection in the accessory shoe from the energy source in order to prevent an electrical shock to the camera operator and a concomitant drop in ignition voltage that might result in flash failure. These cameras, then, can also have the disadvantage of being operatable with only one flash device at a time.

Similarly, there are known cameras having two photoflash connections whereby one flash device is connected to an instantly closing synchronizing contact while the other flash device is connected to a time-delay synchronizing contact.

SUMMARY OF THE INVENTION

An object of this invention, therefore, is to provide means for operating a plurality of electrically energizable photo devices, e.g., flash devices, in such manner as to avoid the interferences and disadvantages mentioned above.

Generally stated, this object is achieved by connecting each of such photo devices to a separate synchronizing contact and then, upon release of an actuating member, connecting the synchronizing contacts to each other and to a common ground.

Various other objects, such as providing for synchronizing control of a function other than photoflash ignition, and advantages, such as low manufacturing cost, will appear from the following description of two embodiments of this invention, and the novel features therein will be particularly pointed out in connection with the appended claims.

In the first embodiment described below, photoflash devices are associated with separate synchronizing contacts that are connected to a common voltage potential, e.g., ground, by means controlled by shutter action.

In the second embodiment, hereinafter described with reference to a mirror-reflex camera, the synchronizing contacts tre connected in series with circuit-breaker points that close, preferably, during mirror movement so as to prevent premature ignition during shutter cocking.

BRIEF DESCRIPTION OF THE DRAWING

The above-mentioned first and second embodiments are illustrated in FIGS. 1 and 2, respectively, of the accompanying drawings, which form a part of this specification, wherein:

FIG. 1 shows, partly in section and partly as a wiring diagram, flash synchronization means in a camera having a built-in flash-lamp socket and an accessory shoe adapted to receive a separable flash device; and FIG. 2 shows, also partly in section and partly as a wiring diagram, flash synchronization means in a mirror-reflex camera having a contact nipple and an accessory shoe adapted to connect electrically two separable flash devices to the camera.

DESCRIPTION OF THE PREFERRED EMBODIMENTS

With reference to FIG. 1, the top 1 of a photographic camera is provided with two connections for flash devices. One of these connections, designated generally by the numeral 20, is shown as a socket for receiving and retaining multilamp "flashcubes," as described, for example, in U.S. Patent No. 3,335,651, entitled "Drive Mechanism for Rotatable Flash Attachment," issued August 15, 1967 in the name of Francis A. Williams et al., although any known flash-lamp socket could be used. In connection 20, the electrical-current-carrying contacts 2a and 2b are arranged within holder 2, which is made of electrically insulating material. Contact 2a is connected to a common electrically conductive portion 15 of the camera body. Contact 2b is connected to one foil of a charging capacitor 3. The other foil of charging capacitor 3 has two connections, one through resistor 4 to battery 5 and thence to body portion 15, the other via conductor 6 to synchronizing contact 11.

The other of the two flash-device connections mounted on camera top 1, designated generally by the numeral 21, is shown as an accessory shoe 9, which is electrically connected to body portion 15 and which has, insulated therefrom, a center contact 8 that is connected via conductor 7 to synchronizing contact 12.

In addition to the above-mentioned synchronizing contacts 11 and 12, there is provided contact 10 which is electrically connected to body portion 15, which portion constitutes the electrical ground common to each of the flash-device circuits involved.

In operation, insertion of a mating flash lamp or "flashcube" in socket 20 causes capacitor 3 to become charged. Actuation of the camera shutter release, as shown, for example, in U.S. Patent No. 3,318,217, entitled "Photoflash Synchronizing Mechanism," issued May 9, 1967, in the name of Paul J. Ernisse, then causes rotation of lever 13 in the direction of arrow A about pivot 14, so that one end of lever 13 strikes the group of closely spacer synchronizing contacts 10, 11, and 12 to connect electrically all three contacts, resulting in the discharging of capacitor 3 and the firing of the flash lamp.

The aforementioned objects of this invention are thus achieved in that, when an additional flash device having its own voltage source is attached at connection 21, interference therewith by the voltage source built into the camera cannot occur because synchronizing contact 12 remains electrically isolated until contacts 10, 11, and 12 are all brought together at the moment of shutter release.

In FIG. 2, the numeral 1' designates any mirror-reflex-camera body portion such as the camera top, and other items correspond in their functions to those of FIG. 1 when they are designated by the same reference numerals followed by primes. In this embodiment, no built-in flash-lamp socket is shown, although such could be included as in FIG. 1. Instead, a connection in the form of a contact nipple 16 is provided whose center contact 17 is connected via circuit-breaker point 18 to synchronizing contact 11'. In like fashion, center contact 8' of accessory shoe 9' is connected via circuit-breaker point 19 to synchronizing contact 12'. Breaker points 18 and 19 are closed at the moment of shutter release as a function of a control member that effects movement of the camera mirror by reciprocating in the directions of arrow B. Such controlled switching action prevents premature flash ignition during shutter cocking, as shown, for example, in U.S. Patent No. 2,956,490.

The aforementioned objects of this invention are here achieved in that ignition voltage is not supplied to center contact 8' of accessory shoe 9' when an electronic flash device is connected to contact nipple 16. Thus the possibility of an electrical shock to the operator and a breakdown of the ignition voltage is avoided. Also, as in the FIG. 1 embodiment, another flash device having its own voltage source may be attached to accessory shoe 9' for operation essentially simultaneously with that of the device connected to contact nipple 16.

In addition to providing for such synchronized operation of two or more photoflash devices, this invention enables the operator to use one or more of the synchronizing contacts for another purpose, e.g., the synchronized triggering of an electronic shutter-speed control.

The invention has been described in detail with particular reference to preferred embodiments thereof, but it will be understood that variations and modifications can be effected within the spirit and scope of the invention as described hereinabove and as defined in the appended claims.

I claim:
1. In a photographic apparatus having at least two devices for receiving photoflash units and first and second electrical contacts on each of the devices, the improvement comprising:
   a common conductor connected electrically to the first contact of each device;
   a plurality of synchronizing contacts respectively connected elecrtically to the second contacts of the devices; and
   means for sequentially electrically connecting one of said synchronizing contacts to said common conductor and then electrically connecting all of said synchronizing contacts to said common conductor.
2. The improvement as defined in claim 1 wherein said common conductor is connected to ground potential, and further comprising means for applying an electrical charge to said one synchronizing contact, whereby said connecting means is effective to dissipate said charge before electrically connecting said one synchronizing contact to the remainder of said synchronizing contacts.
3. The improvement as defined in claim 1 further comprising means for normally disconnecting said synchronizing contacts from the second contacts and for electrically connecting said synchronizing contacts respectively to the second contacts in response to operation of the photographic apparatus, whereby premature energization of the received photoflash units is prevented.
4. In a photographic apparatus having at least two devices for receiving photoflash units and first and second electrical contacts on each of the devices, the improvement comprising:
   a common conductor connected electrically to the first contact of each device;
   a plurality of synchronizing contacts;
   means for electrically connecting one of said synchronizing contacts to the second contact of one of said devices, said connecting means including capacitor means;
   means for applying an electrical charge to said one synchronizing contact;
   means for electrically connecting the other of said synchronizing contacts to the second contact of the other of said devices; and
   means for sequentially electrically connecting said one synchronizing contact to said common conductor and then electrically connecting the remainder of said synchronizing contacts to said common conductor, whereby said sequential connecting means is effective to disciapte said electrical charge on said one synchronizing contact before electrically connecting said one synchronizing contact to the remainder of said synchronizing contacts.
5. A photographic apparatus comprising:
   a plurality of devices for receiving photoflash units;
   first and second electrical contacts on each of said devices;
   a common conductor electrically connected to the first contact of each device;
   a plurality of synchronizing contacts;
   electrical capacitor means;
   means for electrically connecting one of said synchronizing contacts to the second contact of one of said devices through said capacitor means;
   a source of electrical potential connected to said one synchronizing contact through a resistor;

means for electrically connecting the other of said synchronizing contacts to the second contact of the other of said devices; and means for sequentially electrically connecting said one synchronizing contact to said common conductor and then electrically connecting the remainder of said synchronizing contacts to said common conductor.

References Cited

UNITED STATES PATENTS

| 2,960,922 | 11/1960 | Takahama | 95—11.5 |
| 3,303,766 | 2/1967 | Karikawa et al. | 95—42 X |
| 3,318,217 | 5/1967 | Ernisse | 95—11.5 |
| 3,353,465 | 11/1967 | Peterson et al. | 95—11.5 |
| 3,355,559 | 11/1967 | Hahn et al. | 95—11.5 X |
| 3,380,357 | 4/1968 | Harvey | 95—11.5 |

NORTON ANSHER, Primary Examiner

F. L. BRAUN, Assistant Examiner

U.S. Cl. X.R.

240—1.3